United States Patent
Griffin et al.

(10) Patent No.: US 9,152,323 B2
(45) Date of Patent: Oct. 6, 2015

(54) VIRTUAL KEYBOARD PROVIDING AN INDICATION OF RECEIVED INPUT

(75) Inventors: Jason Tyler Griffin, Kitchener (CA); Jerome Pasquero, Montreal (CA); Donald Somerset McCulloch Mckenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 25 days.

(21) Appl. No.: 13/616,423

(22) Filed: Sep. 14, 2012

(65) Prior Publication Data

US 2013/0187858 A1    Jul. 25, 2013

Related U.S. Application Data

(60) Provisional application No. 61/588,504, filed on Jan. 19, 2012.

(51) Int. Cl.
  *G06F 3/041*    (2006.01)
  *G06F 3/0488*   (2013.01)
  *G06F 3/023*    (2006.01)

(52) U.S. Cl.
  CPC .......... *G06F 3/04886* (2013.01); *G06F 3/0237* (2013.01)

(58) Field of Classification Search
  CPC ................................................ G06F 3/0237
  USPC ................................................ 345/168, 173
  See application file for complete search history.

(56) References Cited

U.S. PATENT DOCUMENTS

| | | | |
|---|---|---|---|
| 3,872,433 | A | 3/1975 | Holmes et al. |
| 4,408,302 | A | 10/1983 | Fessel et al. |
| 5,261,009 | A | 11/1993 | Bokser |
| 5,664,127 | A | 9/1997 | Anderson et al. |
| 5,832,528 | A | 11/1998 | Kwatinetz et al. |
| 5,963,671 | A | 10/1999 | Comerford et al. |
| 6,002,390 | A | 12/1999 | Masui |
| 6,064,340 | A | 5/2000 | Croft et al. |
| 6,094,197 | A | 7/2000 | Buxton et al. |
| 6,223,059 | B1 | 4/2001 | Haestrup |
| 6,226,299 | B1 | 5/2001 | Henson |
| 6,351,634 | B1 | 2/2002 | Shin |
| 6,421,453 | B1 | 7/2002 | Kanevsky et al. |

(Continued)

FOREIGN PATENT DOCUMENTS

| | | |
|---|---|---|
| CA | 101021762 A | 8/2007 |
| CA | 2688204 A1 | 7/2010 |

(Continued)

OTHER PUBLICATIONS

Extended European Search Report, dated Jun. 26, 2013, issued for EP 12184574.7-1959/2618248, 10 pages.

(Continued)

*Primary Examiner* — Quan-Zhen Wang
*Assistant Examiner* — Xuemei Zheng
(74) *Attorney, Agent, or Firm* — Fish & Richardson P.C.

(57) ABSTRACT

A virtual keyboard providing an indication of received input and method of controlling the same is provided. The method comprises receiving an input of a character from a virtual keyboard displayed on a display, and highlighting a key in the virtual keyboard which corresponds to the input character when the input character belongs to a current set of characters which is incomplete.

20 Claims, 11 Drawing Sheets

(56) References Cited

U.S. PATENT DOCUMENTS

| | | | |
|---|---|---|---|
| 6,573,844 B1 * | 6/2003 | Venolia et al. | 341/22 |
| 6,621,424 B1 | 9/2003 | Brand | |
| 6,646,572 B1 * | 11/2003 | Brand | 341/22 |
| 6,801,190 B1 | 10/2004 | Robinson et al. | |
| 7,061,403 B2 | 6/2006 | Fux | |
| 7,098,896 B2 | 8/2006 | Kushler et al. | |
| 7,107,204 B1 | 9/2006 | Liu et al. | |
| 7,216,588 B2 | 5/2007 | Suess | |
| 7,259,752 B1 | 8/2007 | Simmons | |
| 7,277,088 B2 | 10/2007 | Robinson et al. | |
| 7,292,226 B2 | 11/2007 | Matsuura et al. | |
| 7,382,358 B2 | 6/2008 | Kushler et al. | |
| 7,394,346 B2 | 7/2008 | Bodin | |
| 7,443,316 B2 | 10/2008 | Lim | |
| 7,479,949 B2 | 1/2009 | Jobs et al. | |
| 7,487,461 B2 | 2/2009 | Zhai et al. | |
| 7,526,316 B2 | 4/2009 | Shimizu | |
| 7,530,031 B2 | 5/2009 | Iwamura et al. | |
| 7,539,472 B2 | 5/2009 | Sloo | |
| 7,661,068 B2 | 2/2010 | Lund | |
| 7,671,765 B2 | 3/2010 | Fux | |
| 7,698,127 B2 | 4/2010 | Trower, II et al. | |
| 7,886,233 B2 | 2/2011 | Rainisto et al. | |
| 7,934,156 B2 | 4/2011 | Forstall et al. | |
| 8,023,930 B2 | 9/2011 | Won | |
| 8,059,101 B2 | 11/2011 | Westerman et al. | |
| 8,065,624 B2 | 11/2011 | Morin et al. | |
| 8,201,087 B2 | 6/2012 | Kay et al. | |
| 8,225,203 B2 | 7/2012 | Unruh | |
| 8,289,283 B2 | 10/2012 | Kida et al. | |
| 8,326,358 B2 | 12/2012 | Runstedler et al. | |
| 8,490,008 B2 | 7/2013 | Griffin et al. | |
| 8,516,386 B2 | 8/2013 | Adam et al. | |
| 8,542,206 B2 | 9/2013 | Westerman et al. | |
| 2002/0080186 A1 | 6/2002 | Frederiksen | |
| 2002/0097270 A1 | 7/2002 | Keely et al. | |
| 2002/0154037 A1 | 10/2002 | Houston | |
| 2002/0180797 A1 | 12/2002 | Bachmann | |
| 2004/0111475 A1 | 6/2004 | Schultz | |
| 2004/0135818 A1 | 7/2004 | Thomson et al. | |
| 2004/0140956 A1 | 7/2004 | Kushler et al. | |
| 2004/0153963 A1 | 8/2004 | Simpson et al. | |
| 2004/0168131 A1 | 8/2004 | Blumberg | |
| 2004/0201576 A1 | 10/2004 | Shimada et al. | |
| 2005/0017954 A1 | 1/2005 | Kay et al. | |
| 2005/0024341 A1 | 2/2005 | Gillespie et al. | |
| 2005/0039137 A1 | 2/2005 | Bellwood et al. | |
| 2005/0052425 A1 | 3/2005 | Zadesky et al. | |
| 2005/0093826 A1 | 5/2005 | Huh | |
| 2005/0162407 A1 | 7/2005 | Sakurai et al. | |
| 2005/0195173 A1 | 9/2005 | McKay | |
| 2005/0244208 A1 | 11/2005 | Suess | |
| 2005/0275632 A1 * | 12/2005 | Pu et al. | 345/171 |
| 2005/0283358 A1 | 12/2005 | Stephanick et al. | |
| 2006/0022947 A1 | 2/2006 | Griffin et al. | |
| 2006/0026521 A1 | 2/2006 | Hotelling et al. | |
| 2006/0033724 A1 | 2/2006 | Chaudhri et al. | |
| 2006/0053387 A1 | 3/2006 | Ording | |
| 2006/0176283 A1 | 8/2006 | Suraqui | |
| 2006/0209040 A1 | 9/2006 | Garside et al. | |
| 2006/0239562 A1 | 10/2006 | Bhattacharyay et al. | |
| 2006/0253793 A1 | 11/2006 | Zhai et al. | |
| 2006/0265648 A1 | 11/2006 | Rainisto et al. | |
| 2006/0265668 A1 | 11/2006 | Rainisto | |
| 2006/0279548 A1 | 12/2006 | Geaghan | |
| 2007/0015534 A1 | 1/2007 | Shimizu | |
| 2007/0040813 A1 | 2/2007 | Kushler et al. | |
| 2007/0046641 A1 * | 3/2007 | Lim | 345/173 |
| 2007/0061753 A1 | 3/2007 | Ng et al. | |
| 2007/0150842 A1 | 6/2007 | Chaudhri et al. | |
| 2007/0156394 A1 | 7/2007 | Banerjee et al. | |
| 2007/0157085 A1 | 7/2007 | Peters | |
| 2007/0229476 A1 * | 10/2007 | Huh | 345/173 |
| 2007/0256029 A1 | 11/2007 | Maxwell | |
| 2007/0263932 A1 | 11/2007 | Bernardin et al. | |
| 2008/0033713 A1 | 2/2008 | Brostrom | |
| 2008/0100581 A1 | 5/2008 | Fux | |
| 2008/0122796 A1 | 5/2008 | Jobs et al. | |
| 2008/0126387 A1 | 5/2008 | Blinnikka | |
| 2008/0136587 A1 | 6/2008 | Orr | |
| 2008/0141125 A1 | 6/2008 | Ghassabian | |
| 2008/0158020 A1 | 7/2008 | Griffin | |
| 2008/0168366 A1 | 7/2008 | Kocienda et al. | |
| 2008/0184360 A1 | 7/2008 | Kornilovsky et al. | |
| 2008/0189605 A1 | 8/2008 | Kay et al. | |
| 2008/0195388 A1 | 8/2008 | Bower et al. | |
| 2008/0231610 A1 | 9/2008 | Hotelling et al. | |
| 2008/0259040 A1 | 10/2008 | Ording et al. | |
| 2008/0266261 A1 | 10/2008 | Idzik | |
| 2008/0273013 A1 | 11/2008 | Levine et al. | |
| 2008/0281583 A1 | 11/2008 | Slothouber et al. | |
| 2008/0304890 A1 | 12/2008 | Shin et al. | |
| 2008/0309644 A1 | 12/2008 | Arimoto | |
| 2008/0316183 A1 | 12/2008 | Westerman et al. | |
| 2008/0318635 A1 | 12/2008 | Yoon et al. | |
| 2009/0002326 A1 | 1/2009 | Pihlaja | |
| 2009/0006991 A1 | 1/2009 | Lindberg et al. | |
| 2009/0025089 A1 | 1/2009 | Martin et al. | |
| 2009/0058823 A1 | 3/2009 | Kocienda | |
| 2009/0058830 A1 | 3/2009 | Herz et al. | |
| 2009/0066668 A1 | 3/2009 | Kim et al. | |
| 2009/0077464 A1 | 3/2009 | Goldsmith et al. | |
| 2009/0085881 A1 | 4/2009 | Keam | |
| 2009/0094562 A1 | 4/2009 | Jeong et al. | |
| 2009/0125848 A1 | 5/2009 | Keohane et al. | |
| 2009/0132576 A1 | 5/2009 | Miller et al. | |
| 2009/0144667 A1 | 6/2009 | Christoffersson et al. | |
| 2009/0150785 A1 | 6/2009 | Asami et al. | |
| 2009/0160800 A1 | 6/2009 | Liu et al. | |
| 2009/0167700 A1 | 7/2009 | Westerman et al. | |
| 2009/0174667 A1 * | 7/2009 | Kocienda et al. | 345/169 |
| 2009/0193334 A1 | 7/2009 | Assadollahi | |
| 2009/0213081 A1 | 8/2009 | Case, Jr. | |
| 2009/0228792 A1 | 9/2009 | Van Os et al. | |
| 2009/0228842 A1 | 9/2009 | Westerman et al. | |
| 2009/0237361 A1 | 9/2009 | Mosby et al. | |
| 2009/0240949 A9 | 9/2009 | Kitchens et al. | |
| 2009/0247112 A1 | 10/2009 | Lundy et al. | |
| 2009/0251410 A1 | 10/2009 | Mori et al. | |
| 2009/0254818 A1 | 10/2009 | Jania et al. | |
| 2009/0259962 A1 | 10/2009 | Beale | |
| 2009/0265669 A1 | 10/2009 | Kida et al. | |
| 2009/0267909 A1 | 10/2009 | Chen et al. | |
| 2009/0284471 A1 | 11/2009 | Longe et al. | |
| 2009/0295737 A1 | 12/2009 | Goldsmith et al. | |
| 2009/0307768 A1 | 12/2009 | Zhang et al. | |
| 2009/0313693 A1 | 12/2009 | Rogers | |
| 2010/0020033 A1 | 1/2010 | Nwosu | |
| 2010/0020036 A1 | 1/2010 | Hui et al. | |
| 2010/0026650 A1 * | 2/2010 | Srivastava et al. | 345/173 |
| 2010/0045705 A1 | 2/2010 | Vertegaal et al. | |
| 2010/0050121 A1 | 2/2010 | Shin | |
| 2010/0052880 A1 | 3/2010 | Laitinen | |
| 2010/0070908 A1 | 3/2010 | Mori et al. | |
| 2010/0079413 A1 | 4/2010 | Kawashima et al. | |
| 2010/0095238 A1 | 4/2010 | Baudet | |
| 2010/0097321 A1 | 4/2010 | Son et al. | |
| 2010/0115402 A1 | 5/2010 | Knaven et al. | |
| 2010/0127991 A1 | 5/2010 | Yee | |
| 2010/0131900 A1 | 5/2010 | Spetalnick | |
| 2010/0141590 A1 | 6/2010 | Markiewicz et al. | |
| 2010/0156813 A1 | 6/2010 | Duarte et al. | |
| 2010/0156818 A1 | 6/2010 | Burrough et al. | |
| 2010/0161538 A1 | 6/2010 | Kennedy, Jr. et al. | |
| 2010/0192086 A1 | 7/2010 | Kocienda et al. | |
| 2010/0197352 A1 | 8/2010 | Runstedler et al. | |
| 2010/0199176 A1 | 8/2010 | Chronqvist | |
| 2010/0225599 A1 | 9/2010 | Danielsson et al. | |
| 2010/0235726 A1 | 9/2010 | Ording et al. | |
| 2010/0253620 A1 | 10/2010 | Singhal | |
| 2010/0257478 A1 | 10/2010 | Longe et al. | |
| 2010/0257490 A1 | 10/2010 | Lyon et al. | |
| 2010/0259482 A1 | 10/2010 | Ball | |
| 2010/0259561 A1 | 10/2010 | Forutanpour et al. | |

(56) References Cited

U.S. PATENT DOCUMENTS

| | | |
|---|---|---|
| 2010/0265181 A1* | 10/2010 | Shore .................... 345/168 |
| 2010/0269040 A1 | 10/2010 | Lee |
| 2010/0277424 A1* | 11/2010 | Chang et al. ............. 345/173 |
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1* | 3/2011 | Causey et al. ............. 345/173 |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0291940 A1 | 12/2011 | Ghassabian |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0050222 A1 | 2/2013 | Moran et al. |
| 2013/0061317 A1 | 3/2013 | Runstedler et al. |
| 2013/0063356 A1 | 3/2013 | Martisauskas |
| 2013/0067382 A1 | 3/2013 | Townsend et al. |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285916 A1 | 10/2013 | Griffin et al. |
| 2013/0285927 A1 | 10/2013 | Pasquero et al. |
| 2013/0285928 A1 | 10/2013 | Thorsander |
| 2013/0285930 A1 | 10/2013 | Thorsander et al. |
| 2013/0290906 A1 | 10/2013 | Thorsander |
| 2013/0314331 A1 | 11/2013 | Rydenhag et al. |
| 2013/0325438 A1 | 12/2013 | Griffin et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1 | 3/2014 | Pasquero et al. |
| 2014/0164977 A1 | 6/2014 | Spetalnick |

FOREIGN PATENT DOCUMENTS

| | | |
|---|---|---|
| CA | 2812457 A1 | 10/2013 |
| CA | 2813393 A1 | 10/2013 |
| CA | 2819839 A1 | 12/2013 |
| CA | 2820997 A1 | 1/2014 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660696 B1 | 11/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| JP | 2011-197782 A | 10/2011 |
| JP | 2012-068963 A | 4/2012 |

(56) References Cited

FOREIGN PATENT DOCUMENTS

| KP | 20120030652 A | 3/2012 |
|---|---|---|
| WO | 03/029950 A2 | 4/2003 |
| WO | 03/054681 A1 | 7/2003 |
| WO | 2004/001560 A1 | 12/2003 |
| WO | 2005/064587 A2 | 7/2005 |
| WO | 2006/100509 A2 | 9/2006 |
| WO | 2007/068505 A1 | 6/2007 |
| WO | 2007/076210 A1 | 7/2007 |
| WO | 2007/134433 A1 | 11/2007 |
| WO | 2008/030974 A1 | 3/2008 |
| WO | 2008/057785 A2 | 5/2008 |
| WO | 2008/085741 A2 | 7/2008 |
| WO | 2009/019546 A2 | 2/2009 |
| WO | 2010/035574 A1 | 4/2010 |
| WO | 2010/035585 A1 | 4/2010 |
| WO | 2010/099835 A1 | 9/2010 |
| WO | 2010/112841 A1 | 10/2010 |
| WO | 2011/073992 A2 | 6/2011 |
| WO | 2011/098925 A1 | 8/2011 |
| WO | 2011/113057 A1 | 9/2011 |
| WO | 2012/043932 A1 | 4/2012 |
| WO | 2013/163718 A1 | 11/2013 |
| WO | 2013/164013 A1 | 11/2013 |

OTHER PUBLICATIONS

Partial European Search Report, dated Mar. 7, 2013, issued for EP 12184574.7-1959, 5 pages.
"Features Included in the T-Mobile G1", http://www.t-mobileg1.com/T-Mobile-G1-Features.pdf, 2009.
"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
BlackBerry Seeker—Freeware—Pattern Lock v1.0.7, http://www.blackberryseeker.com/applications/preview/Pattern-Lock-v107.aspx, Jul. 28, 2009.
Canadian Office Action dated Aug. 8, 2012, issued in Canadian Application No. 2,688,204 (3 pages).
Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 2, 2014, issued in Canadian Application No. 2,812,033, (3 pages).
Canadian Office Action dated Mar. 27, 2013, issued in Canadian Application No. 2,737,314 (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
Chong et al., Exploring the Use of Discrete Gestures for Authentication, IFIP International Federation for Information Processing, 2009.
Conveniently select text, images, annotations, etc. in a PDF or any other text format on a touch based mobile/tablet device, IP.com Journal, Mar. 1, 2011, XP013142665, (10 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Droid X by Motorola © 2010 Screen shots.
Droid X by Motorola © 2010 User Manual (72 pages).
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Apr. 5, 2013, issued in European Application No. 12180190.6 (7 pages).
European Examination Report dated Aug. 22, 2013, issued in European Application No. 12166520.2, (4 pages).
European Examination Report dated Aug. 22, 2013, issued in European Application No. 12173818.1, (6 pages).
European Examination Report dated Dec. 9, 2013, issued in European Application No. 12172458.7, (4 pages).
European Examination Report dated Jun. 2, 2014, issued in European Application No. 12166142.5, (4 pages).
European Examination Report dated Jun. 3, 2014, issued in European Application No. 12172458.7, (5 pages).
European Examination Report dated Mar. 12, 2014, issued in European Application No. 12169649.6, (7 pages).
European Partial Search Report dated Jan. 16, 2013, issued in European Application No. 12182612.7 (5 pages).
European Partial Search Report dated Sep. 16, 2010, issued in European Application No. 10160590.5 (5 pages).
Extended European Search Report dated Aug. 24, 2012, issued in European Application No. 12166115.1 (5 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Aug. 31, 2012, issued in European Application No. 12166170.6 (7 pages).
Extended European Search Report dated Dec. 21, 2012, issued in European Application No. 12173818.1, (8 pages).
Extended European Search Report dated Feb. 28, 2011, issued in European Application No. 10160590.5 (10 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Mar. 8, 2013, issued in European Application No. 12182611.9 (8 pages).
Extended European Search Report dated May 6, 2009, issued in European Application No. 09151723.5 (7 pages).
Extended European Search Report dated Nov. 22, 2012, issued in European Application No. 12172892.7 (7 pages).
Extended European Search Report dated Nov. 28, 2011, issued in European Application No. 11180985.1 (4 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Extended European Search Report dated Sep. 3, 2012, issued in European Application No. 12164300.1 (7 pages).
Final Office Action dated Apr. 11, 2014, issued in U.S. Appl. No. 13/447,704, (18 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Dec. 13, 2013, issued in U.S. Appl. No. 13/572,232, (30 pages).
Final Office Action dated Feb. 1, 2013, issued in U.S. Appl. No. 13/563,943 (17 pages).
Final Office Action dated Feb. 10, 2014, issued in U.S. Appl. No. 13/485,723, (19 pages).
Final Office Action dated Feb. 28, 2013, issued in U.S. Appl. No. 13/524,678 (21 pages).

(56) References Cited

OTHER PUBLICATIONS

Final Office Action dated Jan. 18, 2013, issued in U.S. Appl. No. 13/482,705 (18 pages).
Final Office Action dated Jul. 25, 2013, issued in U.S. Appl. No. 13/560,796, (19 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated Mar. 15, 2013, issued in U.S. Appl. No. 13/572,232 (36 pages).
Final Office Action dated Mar. 26, 2014, issued in U.S. Appl. No. 13/564,697, (9 pages).
Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
Google Mobile Help—Editing text, http://support.google.com/mobile/bin/answer.py?hl=en&answer=168926, date of access: Jun. 6, 2012 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
iPhone User Guide—For iPhone OS 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
Mobile Tech News—Samsung launches new Gesture Lock touchscreen handsets, http://www.mobiletechnews.com/info/2009/03/11/124559.html, Mar. 11, 2009.
Notice of Allowance dated Aug. 12, 2013, issued in U.S. Appl. No. 13/564,687, (10 pages).
Notice of Allowance dated Mar. 15, 2013, issued in U.S. Appl. No. 13/373,356 (25 pages).
Notice of Allowance mailed Oct. 11, 2013, issued in U.S. Appl. No. 13/563,943, (20 pages).
Office Action dated Apr. 11, 2014, issued in U.S. Appl. No. 13/481,171, (29 pages).
Office Action dated Apr. 11, 2014, issued in U.S. Appl. No. 13/572,232, (38 pages).
Office Action dated Apr. 18, 2014, issued in U.S. Appl. No. 13/524,678, (29 pages).
Office Action dated Apr. 21, 2014, issued in U.S. Appl. No. 13/601,736, (33 pages).
Office Action dated Aug. 7, 2012, issued in U.S. Appl. No. 13/482,705 (10 pages).
Office Action dated Dec. 28, 2012, issued in U.S. Appl. No. 13/459,301 (22 pages).
Office Action dated Dec. 6, 2013, issued in U.S. Appl. No. 13/564,697, (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 31, 2014, issued in U.S. Appl. No. 13/534,101, (38 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Jul. 20, 2012, issued in U.S. Appl. No. 12/764,298 (38 pages).
Office Action dated Jun. 11, 2014, issued in U.S. Appl. No. 13/563,182, (12 pages).
Office Action dated Jun. 18, 2014, issued in U.S. Appl. No. 13/601,898, (27 pages).
Office Action dated Jun. 8, 2011, issued in U.S. Appl. No. 12/362,536 (19 pages).
Office Action dated Mar. 12, 2013, issued in U.S. Appl. No. 13/560,796 (22 pages).
Office Action dated Mar. 12, 2014, issued in U.S. Appl. No. 13/616,423, (21 pages).
Office Action dated Mar. 14, 2014, issued in U.S. Appl. No. 13/569,000, (25 pages).
Office Action dated Mar. 26, 2014, issued in U.S. Appl. No. 13/548,469, (46 pages).
Office Action dated May 15, 2014, issued in U.S. Appl. No. 13/482,705, (19 pages).
Office Action dated May 2, 2014, issued in U.S. Appl. No. 13/459,301, (25 pages).
Office Action dated May 21, 2014, issued in U.S. Appl. No. 13/485,723, (18 pages).
Office Action dated May 30, 2013, issued in U.S. Appl. No. 13/572,232 (49 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 22, 2013, issued in U.S. Appl. No. 13/447,704, (47 pages).
Office Action dated Nov. 8, 2012, issued in U.S. Appl. No. 13/373,356 (18 pages).
Office Action dated Oct. 15, 2012, issued in U.S. Appl. No. 13/560,270 (15 pages).
Office Action dated Oct. 17, 2012, issued in U.S. Appl. No. 13/563,943 (17 pages).
Office Action dated Oct. 17, 2013, issued in U.S. Appl. No. 13/485,723, (28 pages).
Office Action dated Oct. 18, 2012, issued in U.S. Appl. No. 13/563,182 (12 pages).
Office Action dated Oct. 23, 2012, issued in U.S. Appl. No. 12/764,298 (41 pages).
Office Action dated Oct. 25, 2012, issued in U.S. Appl. No. 13/459,732 (15 pages).
Office Action dated Oct. 26, 2012, issued in U.S. Appl. No. 13/554,436 (22 pages).
Office Action dated Oct. 5, 2012, issued in U.S. Appl. No. 13/447,835 (20 pages).
Office Action dated Sep. 10, 2012, issued in U.S. Appl. No. 13/524,678 (12 pages).
Office Action dated Sep. 28, 2012, issued in U.S. Appl. No. 13/494,794 (14 pages).
PCT International Search Report and Written Opinion dated Jan. 24, 2013, issued in International Application No. PCT/CA2012/050274 (9 pages).
PCT International Search Report and Written Opinion dated Jun. 14, 2012, issued in International Application No. PCT/IB2011/003273 (8 pages).
PCT International Search Report and Written Opinion dated Nov. 7, 2012, issued in International Application No. PCT/CA2012/050362 (9 pages).
PCT International Search Report and Written Opinion dated Nov. 8, 2012, issued in International Application No. PCT/CA2012/050405 (12 pages).

(56) References Cited

OTHER PUBLICATIONS

PCT International Search Report and Written Opinion dated Oct. 12, 2012, issued in International Application No. PCT/EP2012/057944 (10 pages).
PCT International Search Report and Written Opinion dated Sep. 10, 2012, issued in International Application No. PCT/EP2012/057945 (11 pages).
Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
Swype Product Features, accessed online at http://www.swype.com/about/specifications/ on Feb. 25, 2013 (2 pages).
Through the Magic Window—Magic Window word processor for the Apple II, Artsci Publishing, 1980, http://www.artscipub.com/history/magicwindow, accessed May 21, 2013 (5 pages).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
Touchpal (combination of two sources: first, youtube video on touchpal at url: http://www.youtube.com/watch?v=eJUWFEXxJal, dated on Dec. 1, 2011, with screen captures shown below; second, TimesofIndia website article on touchpal at url: http://articles.timesofindia.indiatimes.com/2012-01-29/computing/30673975_1_swype-android-market-qwerty, dated Jan. 29, 2012).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/481,171, filed May 25, 2012, (24 pages).
U.S. Appl. No. 13/525,576, filed Jun. 18, 2012, (87 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,736, filed Aug. 31, 2012, (44 pages).
U.S. Appl. No. 13/601,864, filed Aug. 31, 2012, (23 pages).
U.S. Appl. No. 13/601,898, filed Aug. 31, 2012, (28 pages).
U.S. Appl. No. 13/616,423, filed Sep. 14, 2012, (30 pages).
U.S. Appl. No. 13/773,812, filed Feb. 22, 2013, (94 pages).
User Guide Samsung Moment(TM) with Google(TM), dated Dec. 4, 2009 (122 pages).
User Guide Samsung Moment(TM) with Google(TM), dated Mar. 2, 2010 (218 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Office Action issued in EP Application No. 12184574.7 on Dec. 11, 2014; 7 pages.
United States Office Action in U.S. Appl. No. 13/485,723, dated Aug. 29, 2014, 18 pages.
United States Office Action in U.S. Appl. No. 13/525,576, dated Jul. 21, 2014, 19 pages.
United States Office Action in U.S. Appl. No. 13/534,101, dated Jul. 2, 2014, 15 pages.
United States Office Action in U.S. Appl. No. 13/569,000, dated Jul. 28, 2014, 13 pages.
United States Office Action in U.S. Appl. No. 13/601,736, dated Sep. 15, 2014, 19 pages.
United States Office Action in U.S. Appl. No. 13/601,864, dated Sep. 8, 2014, 9 pages.
Canadian Office Action in Canadian Application No. 2,793,629, dated Jul. 8, 2014, 4 pages.
Canadian Office Action in Canadian Application No. 2,812,457, dated Jun. 25, 2014, 5 pages.
Canadian Office Action in Canadian Application No. 2,813,393, dated Jul. 17, 2014, 4 pages.
Canadian Office Action in Canadian Application No. 2,819,839, dated Jun. 30, 2014, 3 pages.
Canadian Office Action in Canadian Application No. 2,821,784, dated Jul. 3, 2014, 3 pages.
Canadian Office Action in Canadian Application No. 2,821,814, dated Jun. 19, 2014, 3 pages.
European Communication Pursuant to Article 94(3) in European Application No. 12184574.7, dated Dec. 11, 2014, 7 pages.
German Office Action in German Application No. 112012000299.7-51, dated Sep. 1, 2014, 6 pages.

\* cited by examiner

VIRTUAL KEYBOARD PROVIDING AN INDICATION OF RECEIVED INPUT

RELATED APPLICATION DATA

The present application claims priority to and the benefit of provisional U.S. patent application No. 61/588,504, filed Jan. 19, 2012, which is incorporated herein by reference in its entirety. The present disclosure also relates to commonly owned U.S. patent application Ser. No. 13/373,356, filed Nov. 10, 2011, which is incorporated herein by reference in its entirety.

TECHNICAL FIELD

The present disclosure relates generally to input methodologies for electronic devices, such as handheld electronic devices, and more particularly, to methods for indicating received input on an electronic device.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DESCRIPTION OF EXAMPLE EMBODIMENTS

Figure 1:
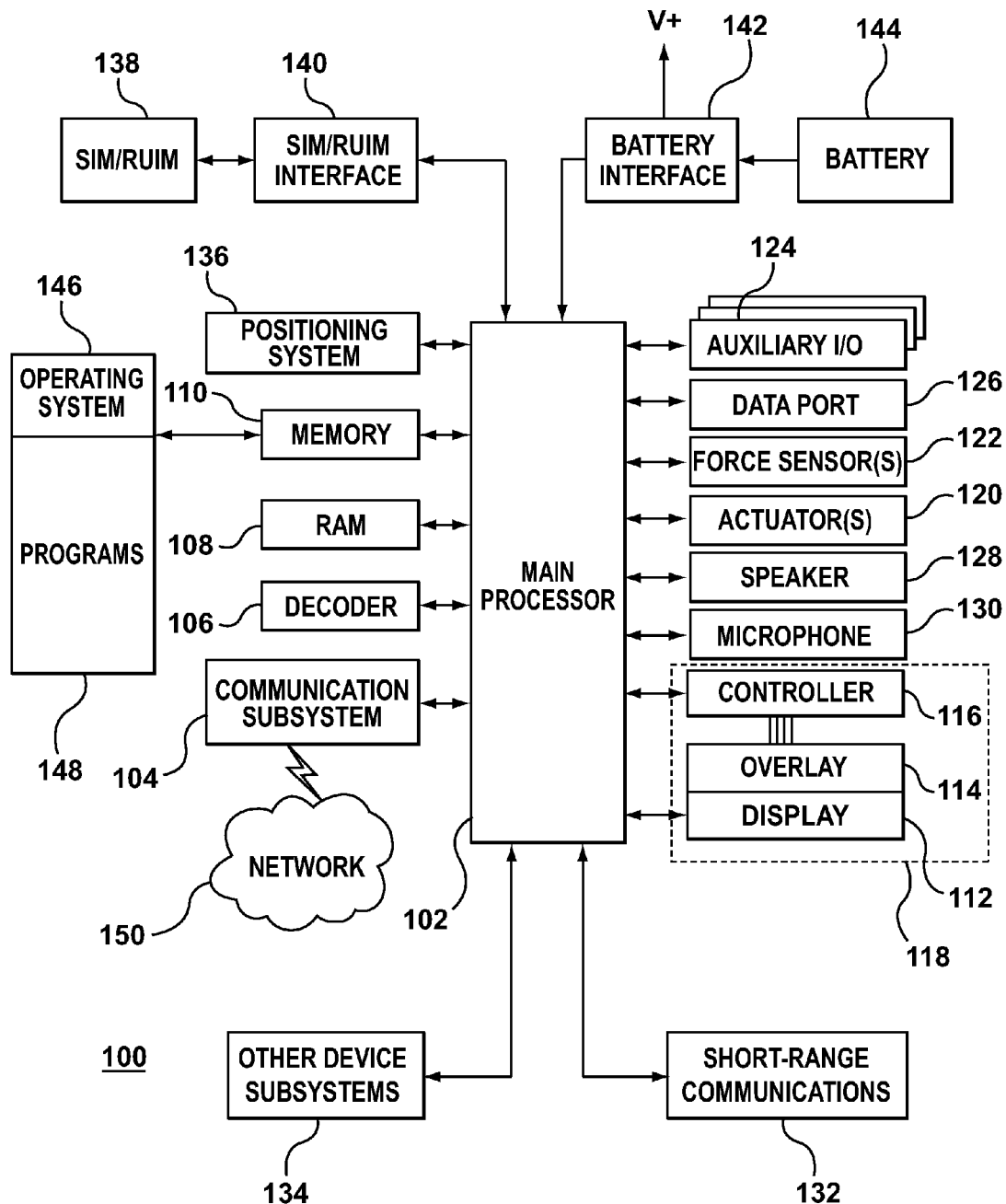
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device.

Basic predictive text input solutions have been introduced for assisting with input on an electronic device. These solutions include predicting which word a user is entering and offering a suggestion for completing the word. But these solutions can have limitations, often requiring the user to input most or all of the characters in a word before the solution suggests the word the user is trying to input. Even then, a user often has to divert focus from the keyboard to view and consider the suggested word displayed elsewhere on the display of the electronic device, and thereafter, look back at the keyboard to continue typing. Similarly, a user may divert focus from the keyboard to view previously inputted characters to confirm the desired characters were inputted correctly. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

The efficiency of predictive text input solutions, from the perspective of both device resources and user experience, sometimes depends on the particular user and the nature of the interaction of the particular user with the touchscreen. Virtual keyboard usage patterns can be broadly categorized as being of two types: "rapid" and "precise". Rapid typists are typically fast two-thumb typists which rely on auto-correction. This usage pattern corresponds most closely with experienced, frequent touchscreen users. Precise typists are typically careful typists who are inclined to use a single finger point to tap (or touch) keys in the virtual keyboard, and often choose predictions as an input accelerator rather than auto-correction. This usage pattern corresponds most closely with novice/new touchscreen users as well as potentially one-handed (thumb) use situations.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the", or "said," particularly after a feature has been introduced with the indefinite article, is meant to include one or more than one of the feature to which it refers (unless otherwise indicated). Therefore, the term "the generated set of characters" as used in "displaying the generated set of characters" includes displaying one or more generated set of characters. References to orientation contained herein, such as horizontal and vertical, are relative to the screen orientation of a graphical user interface rather than any physical orientation.

In one embodiment, a method is provided that comprises receiving an input of a character from a virtual keyboard displayed on a display, and highlighting a key in the virtual keyboard which corresponds to the input character when the input character belongs to a current set of characters which is incomplete.

In other embodiments, there is provided an electronic device which comprises a processor and a touchscreen display having a virtual keyboard displayed thereupon coupled to the processor. The processor is configured to perform the methods described herein.

In other embodiments, there is provided a graphical user interface (GUI) displayed on a display of an electronic device. The GUI includes a virtual keyboard displayed on a touchscreen display and is configured to perform the methods described herein. In one example, there is provided a keyboard rendered and display on a touchscreen display of an electronic device, the keyboard comprising: a plurality of keys, each key corresponding to one or more different characters of a plurality of characters; wherein in response to receiving an input of a character, the keyboard is configured to key in the virtual keyboard which corresponds to the input character when the input character belongs to a current set of characters which is incomplete.

These example embodiments, as well as those described below seek to permit the user of an electronic device to review inputted characters displayed on a virtual keyboard without diverting attention from the virtual keyboard and subsequently refocusing. The example embodiments may also provide feedback as to which keys have been recently pressed, and may notify the user of a potential typographical error. This allows the focus to remain on the keyboard, which enhances efficiency, accuracy, and speed of character input.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered and displayed on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

As used herein, a predictor (such as a predictive algorithm, program or firmware) includes a set of instructions that when executed by a processor (for example, main processor 102), can be used to a disambiguate for example, received ambiguous text input and provide various options, such as a set of characters (for example, words or phrases, acronyms, names, slang, colloquialisms, abbreviations, or any combination thereof) that a user might be contemplating. A predictor can also receive otherwise unambiguous text input and predict set of characters potentially contemplated by the user based on several factors, such as context, frequency of use, and others as appreciated by those skilled in the field. For example, in the predictor is a program 148 residing in memory 110 of electronic device 100. Accordingly, in some example embodiments, device 100 may include a predictor for generating a set of characters corresponding to a subsequent candidate input character based on inputted characters. In some example embodiments the predictor program is executed by a processor, while in other the predictor may be executed by a virtual keyboard controller.

Figure 2:
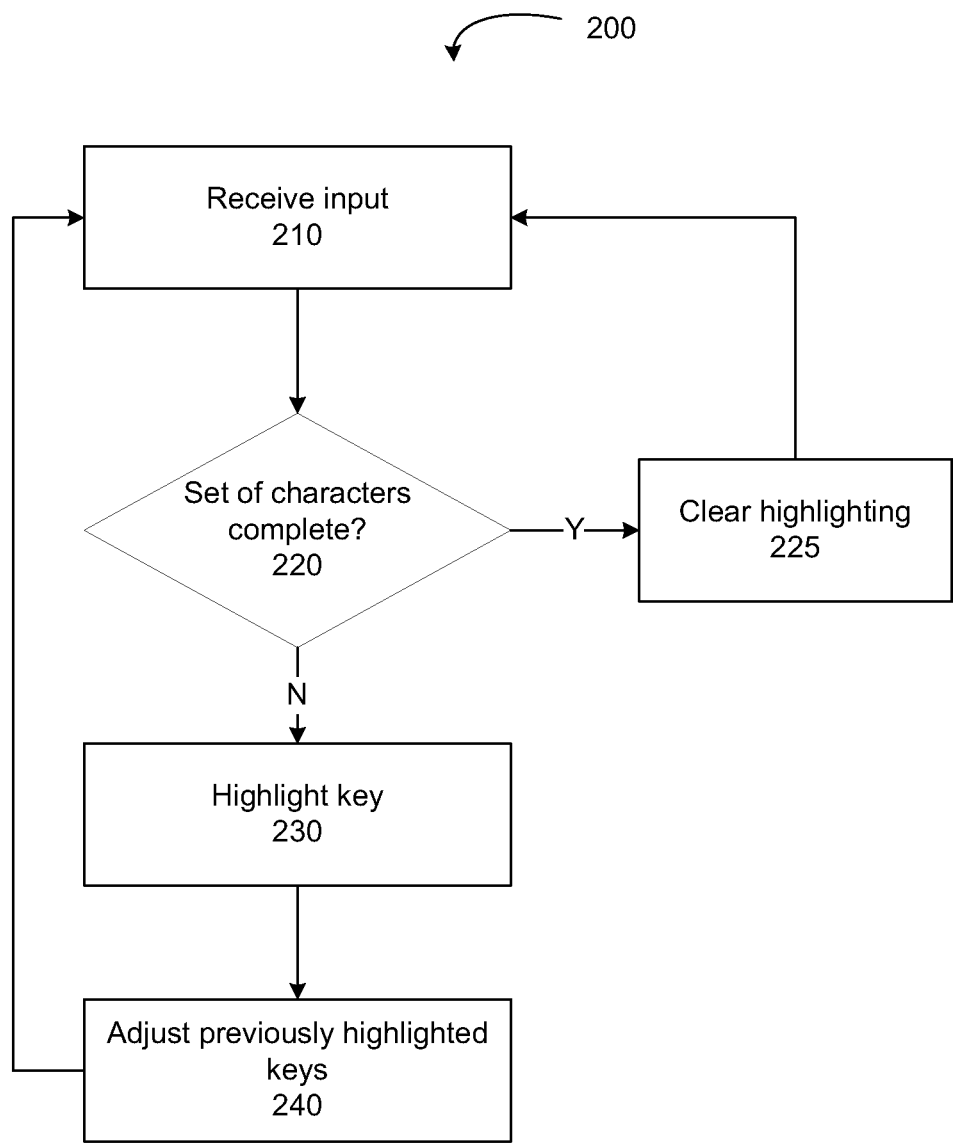
FIG. 2 is a flowchart illustrating an example method for predicting a selected set of characters, consistent with embodiments disclosed herein.

FIG. 2 is a flowchart illustrating an example method 200 for indicating inputted text, consistent with example embodiments disclosed herein. Example method 200 begins at block 210, where the processor receives an input from the user such as a character from a virtual keyboard displayed on the touchscreen 118, a backspace command, or an autocomplete or autocorrect command. As used herein, a character can be any alphanumeric character, such as a letter, a number, a symbol, a punctuation mark, and the like. The inputted character can be displayed in an input field (for example, input field 330 further described below in FIGS. 3-6) that displays characters input using the virtual keyboard. A backspace command may be a tap of a backspace key, a right-to-left swipe, or any other gesture or input configured as a backspace command.

In some example embodiments, a predictor program may display one or more predicted sets of characters which the user may be contemplating. The sets of characters may include words or phrases, acronyms, names, slang, colloquialisms, abbreviations, or any combination thereof based on the input received. The set of characters may be selected from a dictionary stored in a memory of the electronic device, a set of characters that were previously inputted by user (for example, a name or acronym), a set of characters based on a hierarchy or tree structure, a combination thereof, or any set of characters that are selected by a processor based on defined arrangement. In these example embodiments, the processor may receive an autocomplete or autocorrect command. This command may be a swipe, a tap or hold of the spacebar or enter key, a tap or hold of the displayed predicted set of characters, or any other gesture or input.

At block 220, the processor determines whether the received input completes a set of inputted characters. The set of characters may be determined to be complete when the received input is a delimited input such as a spacebar input, an enter key input, a punctuation mark input, or an autocomplete or autocorrect command input.

When the set of characters is not complete, at block 230, if the received input at block 210 is a character input, the processor is configured at block 230 to highlight the keyboard key corresponding to the character input. For example, if a user selects the 'A' key on the keyboard, the 'A' key is highlighted on the virtual keyboard. Examples of highlighting a key include backlighting, brightening, underlining, bolding, italicizing, changing the color, increasing the size, or any combinations thereof, or in any other way for making the key or its character(s) more visible. The highlighting may be applied to the entire key or to portions of the key, such as the edge around each key, the character displayed within each key, areas within each key, or areas surrounding each key.

At optional block 240, the processor may be configured to adjust the highlighting of one or more highlighted keys based on one or more predetermined criteria, such as a temporal measurement. The adjusting may comprise decreasing an intensity of the highlighting or cancelling of the highlighting. The adjusting may be based on a duration of time since a last input was received (i.e., since a key in the virtual keyboard was last touched or tapped). In such examples, the one or more predetermined criteria comprises a duration of time since a last input was received from the virtual keyboard 320. The last input is associated with one of the highlighted keys.

The adjusting may also be based on duration of time since a last interaction with the particular keys in the virtual keyboard which correspond to the input characters in the current set of characters. For example, the highlighting of a particular key may be adjusted after a duration of time since the particular key was last touched (e.g., tapped) or otherwise selected. In such examples, the one or more predetermined criteria may comprise a duration of time since a last interaction with the particular keys in the virtual keyboard which correspond to the input characters in the current set of characters. In some examples, the adjusting comprises decreasing an intensity of the highlighting progressively over time. The intensity of the highlighting may be decreased progressively reduced from a last interaction with the one or more particular keys in the virtual keyboard.

The adjusting may also be based on the number of characters input subsequent to when a particular key was touch (e.g., tapped) or otherwise selected. For example, highlighting of a particular key in the virtual keyboard may be cancelled or reduced after a predetermined number of subsequent character inputs. In such examples, the one or more predetermined criteria comprises an occurrence of a predetermined number of subsequent character inputs since a last input was received from the virtual keyboard 320.

The one or more predetermined criteria described above may be used independently or in any combination thereof.

In some examples, optional block 240 is omitted, and after highlighting a key in the virtual keyboard 320 at block 230, the method 200 returns to block 210 at which a next input is received.

In some example embodiments, the highlighting at block 230 and/or adjusting of the highlighting at block 240 may be based on previously inputted characters and a generated set of characters or a predicted set of characters. For example, keys which match the generated (e.g., predicted) set of characters may be highlighted in a first format. This indicates that the processor 102 predicts that characters have been input correctly. Keys which do not match the generated (e.g., predicted) set of characters may be highlighted in a second format different from the first format. This indicates that the processor 102 predicts that characters have been input incorrectly. The first format and second format of highlighting may vary in different ways, for example, by color. In some examples, only the set of predicted input characters having the highest predictive rank are considered. In such examples, the highlighting comprises highlighting in the first format one or more keys of the virtual keyboard which match a set of predicted input characters having the highest predictive rank and highlighting in the second format one or more keys of the virtual keyboard which do not match the set of predicted input characters having the highest predictive rank.

Returning to block 220, when the processor 102 determines that a received input completes the current set of characters, in some example embodiments, the processor, at block 225, clears the highlighting (i.e., unhighlighting) of all highlighted keys. In some example embodiments, where individual key highlighting is cleared in block 240, block 225 may be omitted. That is, where highlighting is adjusted with time or subsequent character input, clearing the highlighting of all highlighted keys is not required as highlighting of the keys will be reduced and eventually canceled with time or subsequent character input. However, unhighlighting of all highlighted keys when the current set of characters is complete reduces the visual information presented in the virtual keyboard 320 by removing key highlighting when no longer relevant to the current set of characters being input.

FIGS. 3-6 illustrate a series of example front views of the touchscreen 118 having a virtual keyboard 320, consistent with example embodiments disclosed herein. Starting with FIG. 3, touchscreen 118 includes a virtual keyboard 320 that is touch-active. The position of the virtual keyboard 320 is variable such that virtual keyboard 320 can be placed at any location on touchscreen 118. Touchscreen 118 could be configured to detect the location and possibly pressure of one or more objects at the same time. Touchscreen 118 includes two areas: (1) an input field 330 that displays characters after a user has inputted those characters and (2) the virtual keyboard 320 that receives the input from the user. As described in U.S. patent application Ser. No. 13/373,356, the virtual keyboard 320 can be used to display a set of predicted characters at a location on the keyboard based on previously inputted characters, such as in the respective keys of the virtual keyboard 320 which correspond to the next character in the set of predicted characters.

The examples and embodiments illustrated in FIGS. 3-6 can be implemented with any set of characters, such as words, phrases, acronyms, names, slang, colloquialisms, abbreviations, expressions or any combination thereof.

Figure 3:
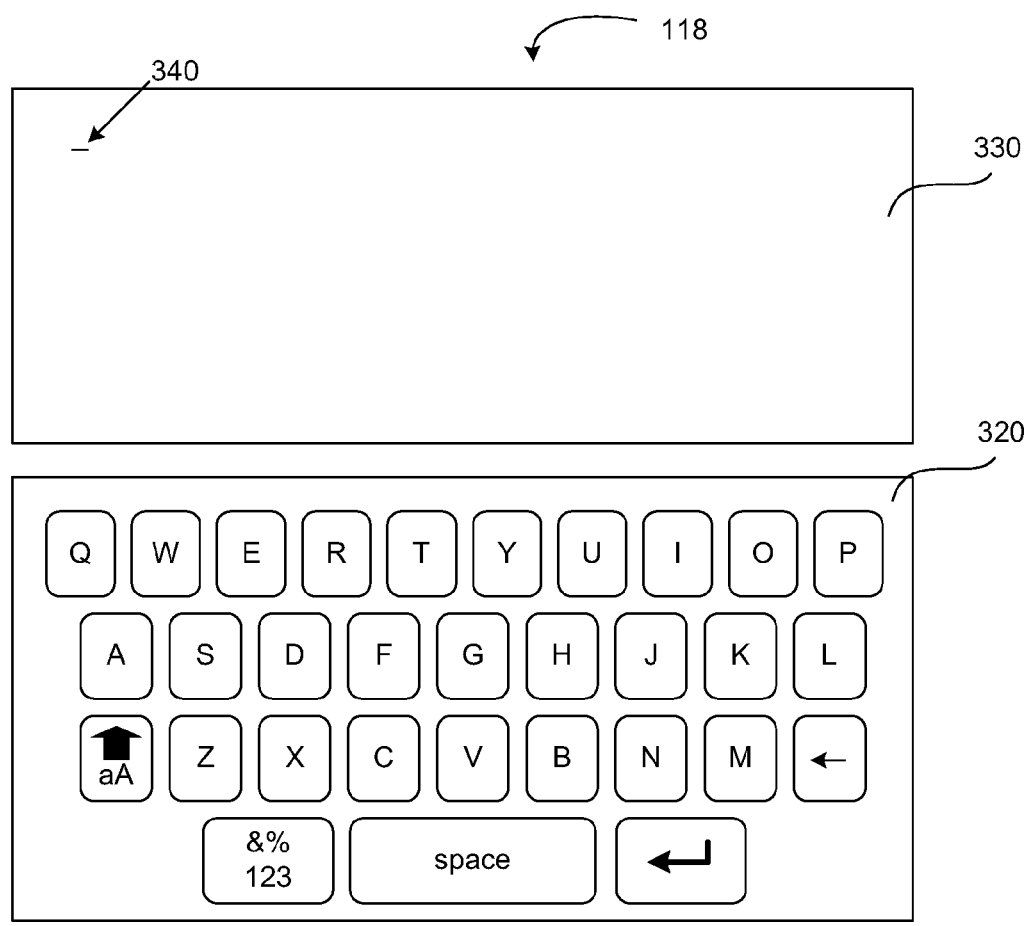
FIGS. 3, 4A, 4B, 4C, 5A, 5B, 5C, 6A, and 6B show example front views of a touchscreen, consistent with embodiments disclosed herein.

As shown in FIG. 3, touchscreen 118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 350 as well as other keys that can provide different inputs, such as punctuation, letters, numbers, enter or return keys, and function keys. While virtual keyboard 320 is shown as having a square shape, it can have any other shape (such as an arch).

As shown in FIG. 3, touchscreen 118 displays an input field 330 which displays the characters inputs using virtual keyboard 320. The input field 330 includes a cursor 340, which can be an underscore (as shown) or any other shape, such as a vertical line. Cursor 340 represents the character space where a next inputted character, selected character, or selected set of characters will be inserted.

Figure 4A:
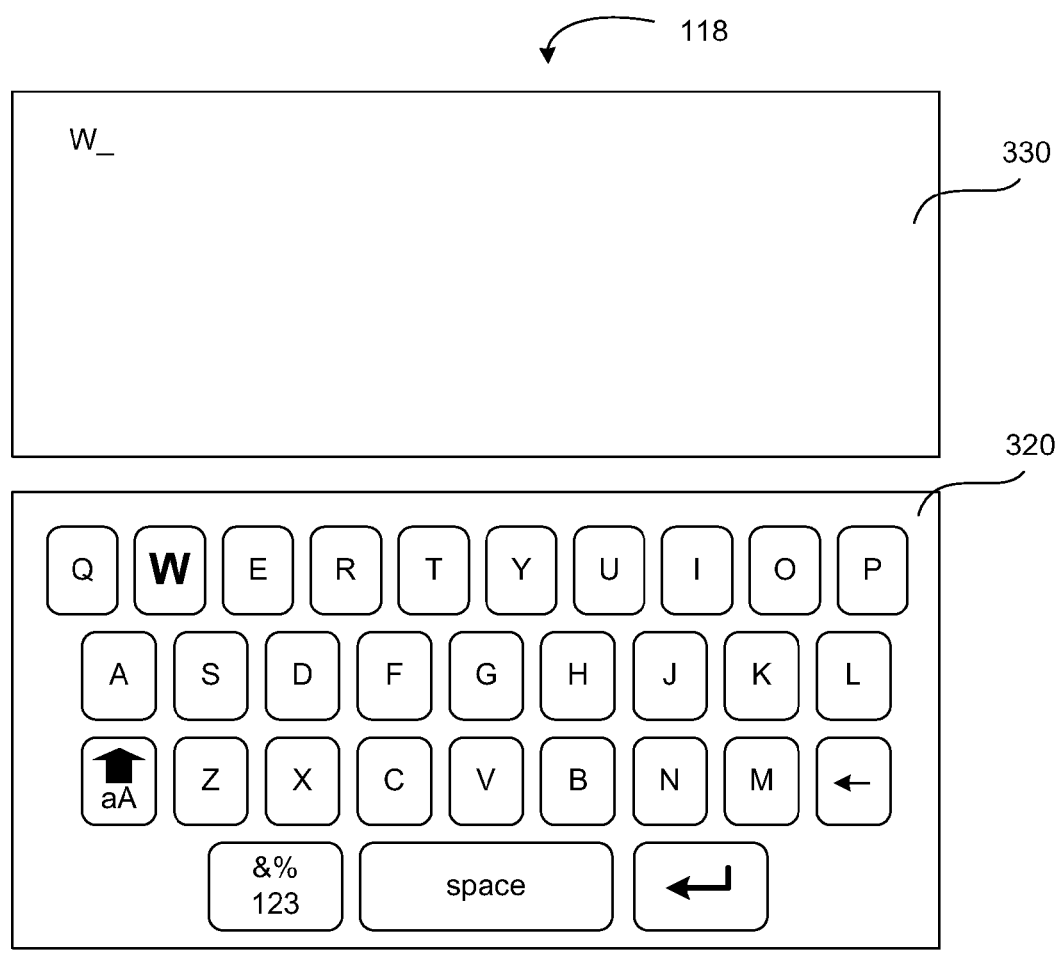

As shown in FIG. 4A, when a user inputs a character (in this example, "W"), this character is displayed in input field 330 and cursor 340 moves to the character space where the next inputted character or word will be inserted. After the character is inputted, the electronic device determines that the word or set of characters is not complete, and highlights the 'W' key. In this example embodiment, the 'W' key is highlighted by bolding the letter within the key.

Figure 4B:
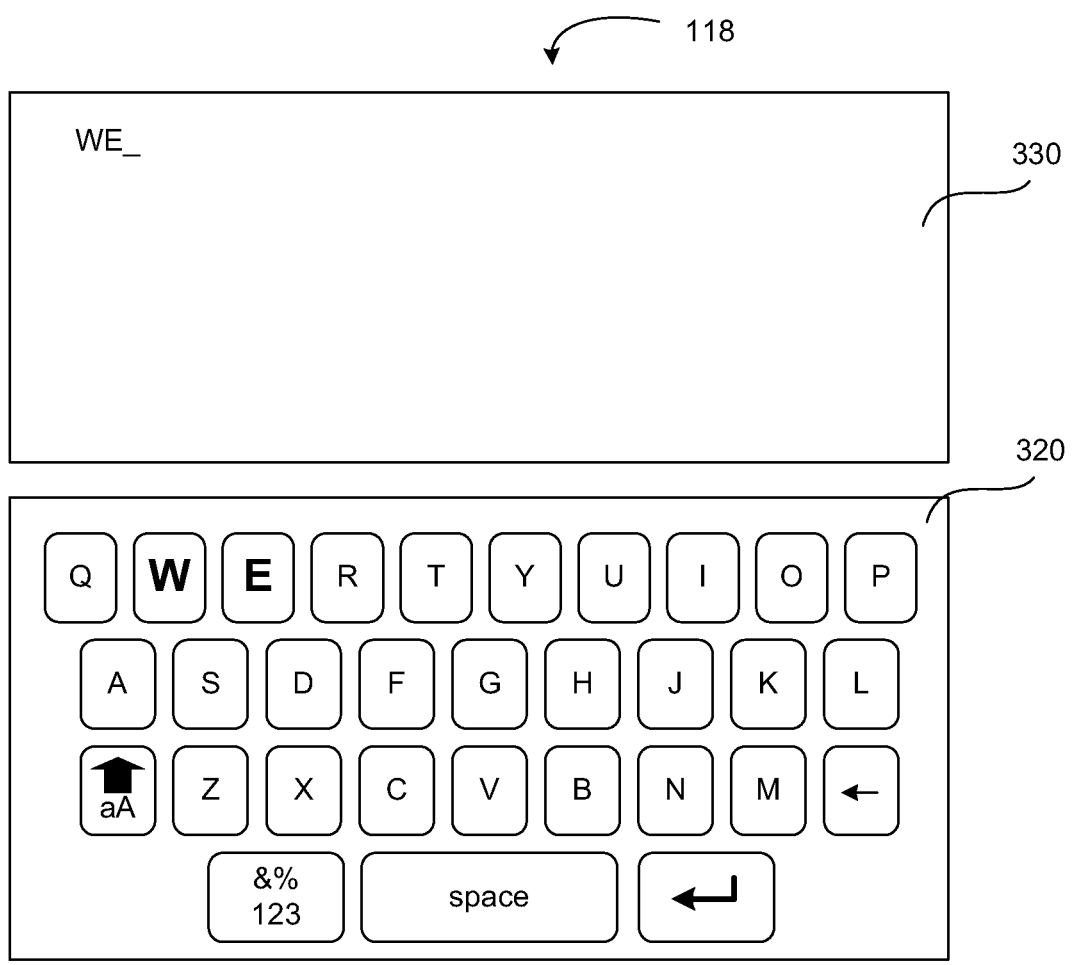

As shown in FIG. 4B, "E" is received as a next input and is displayed in the input field. After the "E" character is inputted, the electronic device determines that current set of characters is not complete, and highlights the "E" key.

Figure 4C:
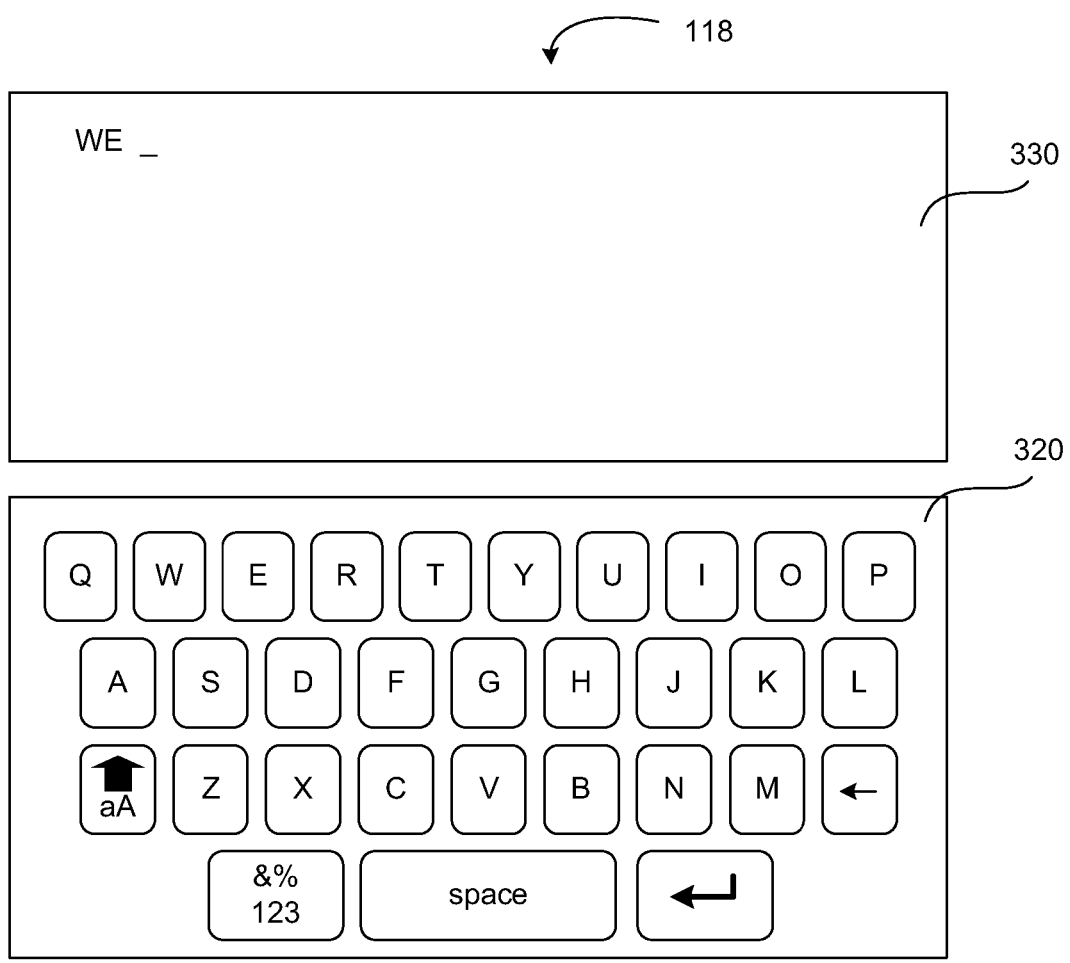

As shown in FIG. 4C, the spacebar is received as a next input and is displayed in the input field by advancing the cursor. With the spacebar input, the electronic device determines that the current set of characters (i.e. the "WE") is complete, and clears the highlighting of the 'W' and 'E' keys on the keyboard.

Figure 5A:
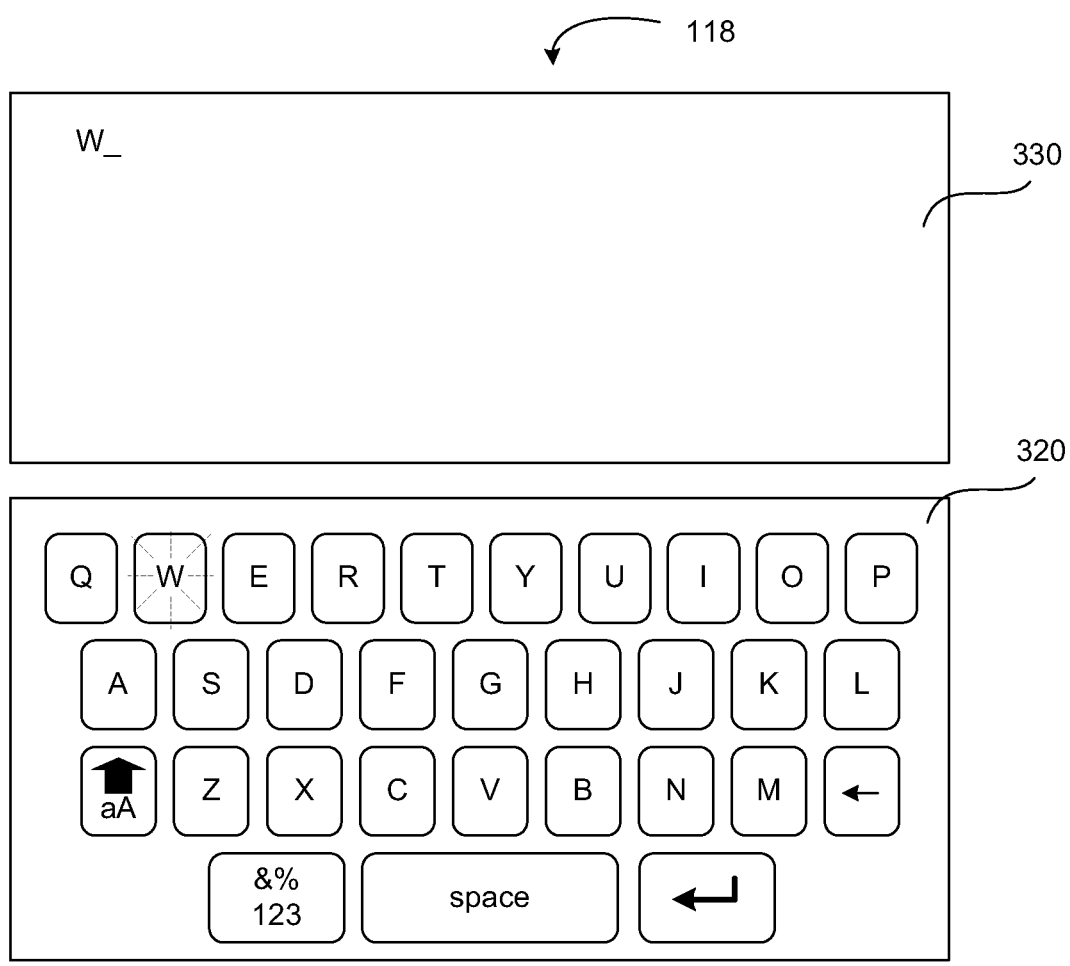

Referring to FIG. 5A, another example is shown where the user has inputted the letter "W" by pressing the 'W' key. In this example, the 'W' key has been highlighted by increasing the brightness or intensity of the 'W' key as illustrated by the dotted lines.

Figure 5B:
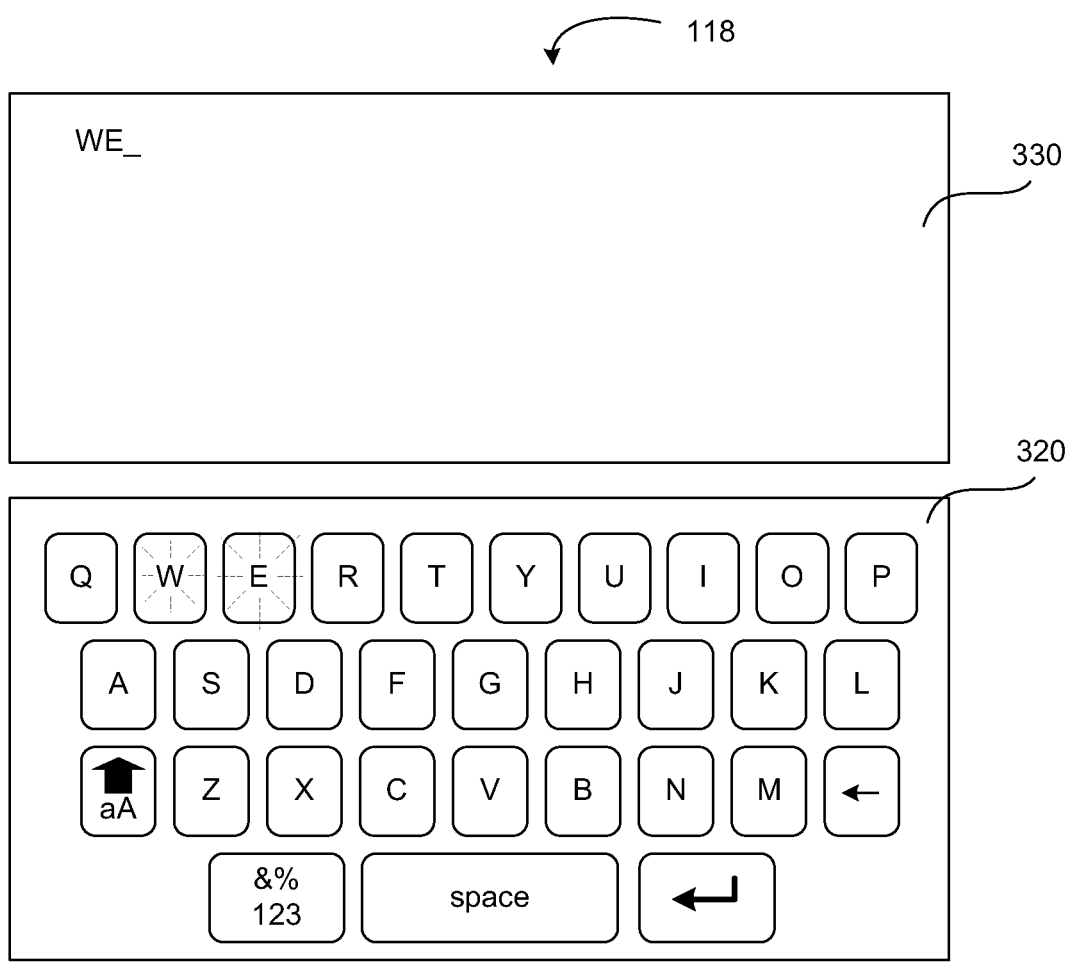

As shown in FIG. 5B, "E" is received as a next input and is displayed in the input field. After the "E" character is inputted, the electronic device determines that current set of characters is not complete, and highlights the 'E' key by increasing its brightness. One character has been input subsequent to the letter 'W', so the highlighting of the 'W' is reduced so that it is less bright than when it was originally highlighted and less bright than the newly highlighted "E".

Figure 5C:
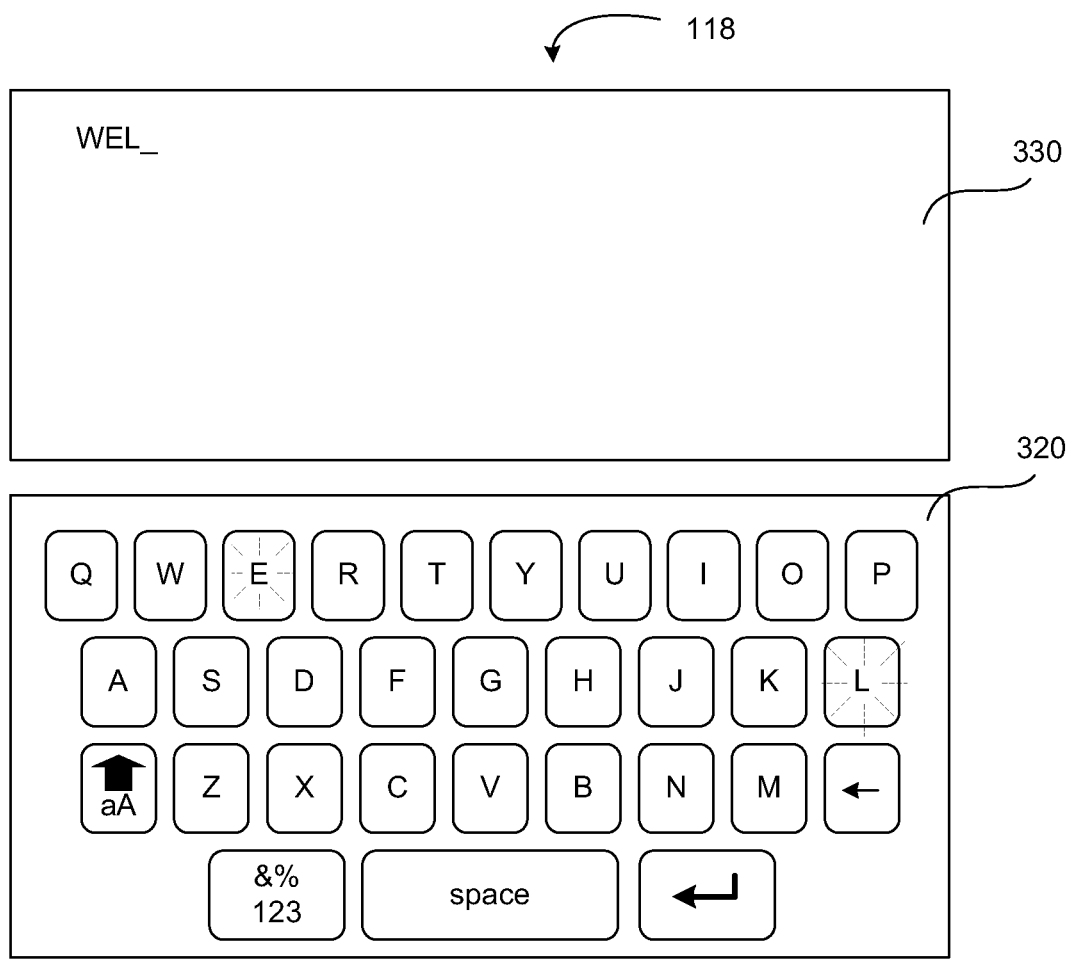

As shown in FIG. 5C, "L" is received as a next input and is displayed in the input field. After the "L" character is inputted, the electronic device determines that current set of characters is not complete, and highlights the 'L' key by increasing its brightness. Two characters have been input subsequent to the letter 'W', so the highlighting of the 'W' key is cleared/removed. One character has been input subsequent to the letter 'E', so the highlighting of the 'E' is reduced so that it is less bright than when it was originally highlighted and less bright than the newly highlighted "L".

In the above example, there are three degrees of key highlighting (e.g., high brightness, medium brightness, and normal brightness). However, any number of degrees, types and combinations of highlighting are possible. The levels of highlighting need not correspond to the number of subsequent characters before highlighting is reduced or cleared/removed. For example, the highlighting of a character may stay at the same level for several subsequent characters.

In yet another example, the highlighting (such as brightness or boldness) of a recently pressed key may decrease gradually with the amount of time that has elapsed since the key was pressed.

In yet other embodiments, decreasing the amount of highlighting of a key may be based on both the number of characters input subsequent to when the key was last tapped or otherwise selected and the amount of time which has lapsed since the key was last tapped or otherwise selected.

In any of the examples described herein, the highlighting of all keys may or may not be clear upon the completion of the current set of characters such as when the spacebar is pressed or when a word is autocompleted or autocorrected.

In the above examples, the highlighting of keys may allow the user to identify which keys have been pressed without changing focus from the keyboard to the input field. The highlighting provides an input trail in the form of a visual indication on the virtual keyboard 320. This input trail may allow users to identify mistakenly inputted letters or potential spelling errors.

In any of the examples described herein, when a user selects the backspace key or a delete key, the character at or to the left of the cursor in the input field is deleted, and the highlighting of the deleted character may be cleared.

Figure 6A:
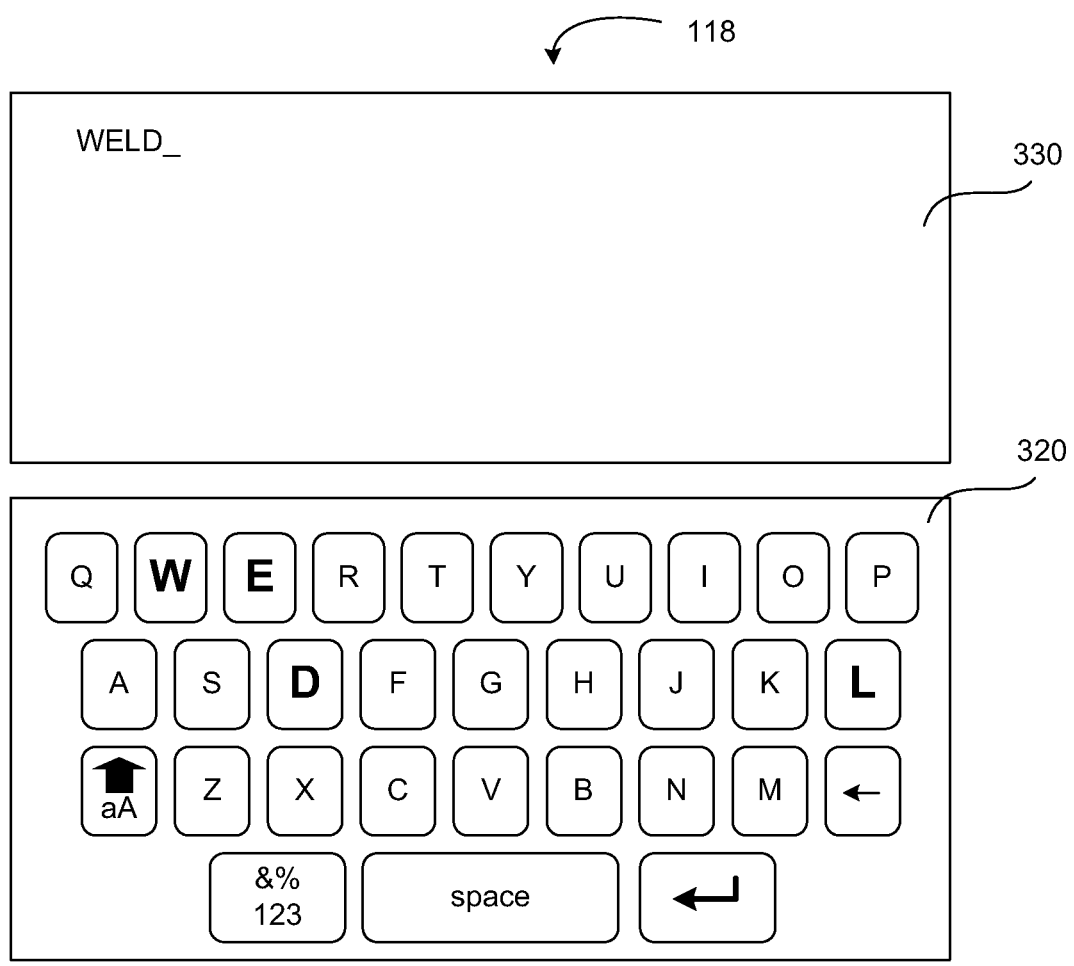

Referring to FIG. 6A, another example is shown where the user has previously inputted the letters "W", "E", "L", "D". The four keys have been highlighted by bolding the font of the letters displayed on the keys.

Figure 6B:
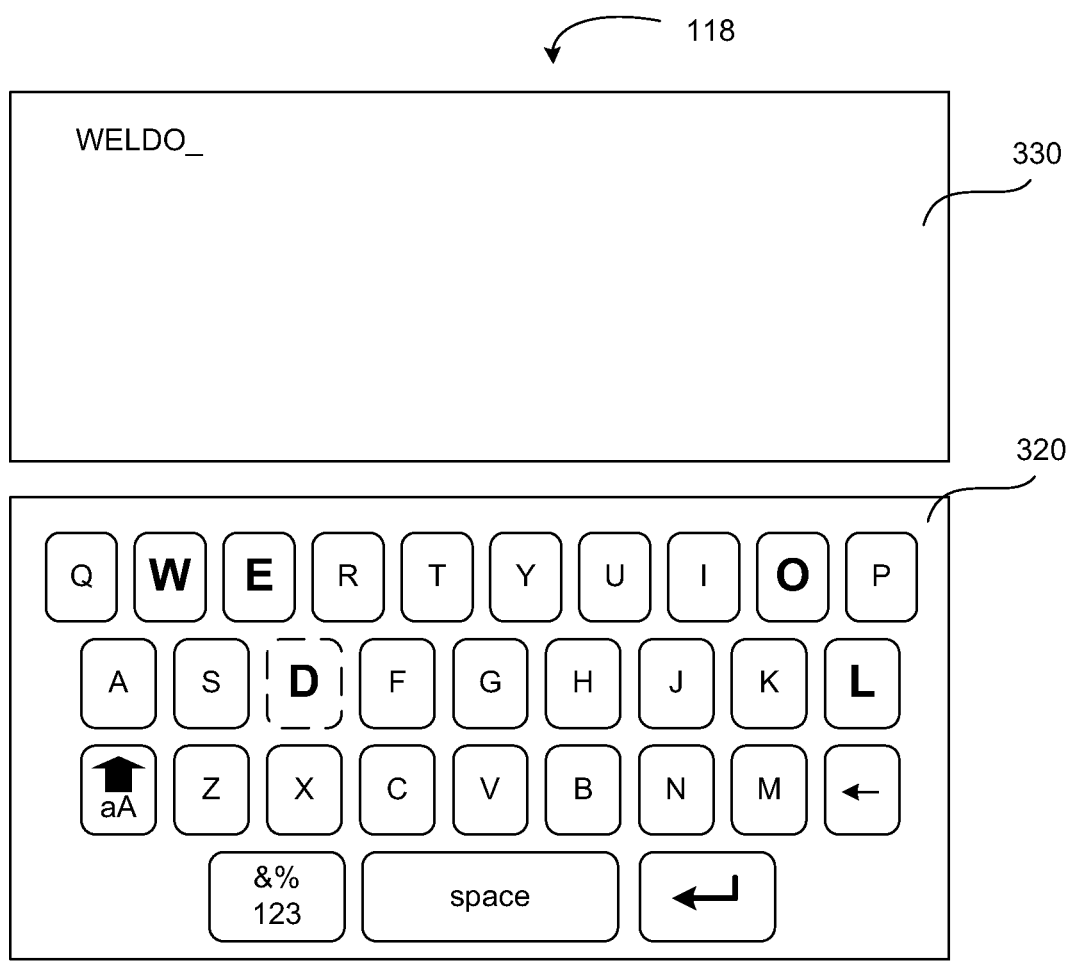

As shown in FIG. 6B, the next input received is the letter "O". The electronic device determines that the current set of characters is not complete, and highlights the 'O' key by bolding the font of the key. Using a predictor, a spell check, or other program, the electronic device determines that there may be an error in the current set of characters. If the device predicts that the intended word is "WELCOME", the device will determine that the "D" input was incorrect. As a result, the device may adjust the highlighting of the 'D' key to make the key red as illustrated by the dashed edge around the D key in FIG. 6B.

In another example, depending on the prediction algorithm, the device may predict that the intended word is "SELDOM" and highlight in red the 'W' key rather than the 'D' key. In some example embodiments, the highlighting of both the 'W' and the 'D' keys may be adjusted to indicate a potential error in one or both of those keys.

As discussed above, any variation or combination highlighting colors, effects, or timings may be applied to the embodiments of the present disclosure.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method, comprising:
receiving an input of a character from a virtual keyboard displayed on a display;
highlighting a key in the virtual keyboard which displays the input character when the input character belongs to a current set of characters which is incomplete, wherein the highlighted key is in a plurality of highlighted keys;
receiving a subsequent user input from the virtual keyboard;
upon a determination of an erroneous character in the current set of characters, adjusting the highlighting of one or more of the highlighted keys in the virtual keyboard which display the determined erroneous character;
upon a determination that the subsequent user input completes the current set of characters based on the subsequent user input being a delimiter input, unhighlighting all highlighted keys in the virtual keyboard; and
upon a determination that the subsequent user input does not complete the current set of characters, adjusting the highlighting of one or more of the highlighted keys in the virtual keyboard based on one or more predetermined criteria.

2. The method of claim 1, wherein the one or more predetermined criteria comprises a duration of time since a last input was received from the virtual keyboard.

3. The method of claim 2, wherein the last input is associated with one of the highlighted keys.

4. The method of claim 1, wherein the one or more predetermined criteria comprises occurrence of a predetermined number of subsequent character inputs since a last input was received from the virtual keyboard.

5. The method of claim 1, wherein the one or more predetermined criteria may comprise a duration of time since a last interaction with the particular keys in the virtual keyboard which correspond to the input characters in the current set of characters.

6. The method of claim 1, wherein the adjusting comprises decreasing an intensity of the highlighting.

7. The method of claim 6, wherein the intensity of the highlighting is decreased progressively over time.

8. The method of claim 7, wherein the intensity of the highlighting of one or more particular keys in the virtual keyboard is decreased progressively from a last interaction with the one or more particular keys in the virtual keyboard.

9. The method of claim 1, further comprising:
generating one or more sets of predicted input characters based on the input character; and
wherein the highlighting comprises:
highlighting in a first format one or more keys of the virtual keyboard which match the one or more sets of predicted input characters; and
highlighting in a second format one or more keys of the virtual keyboard which do not match the one or more sets of predicted input characters.

10. The method of claim 9, wherein the highlighting comprises:
highlighting in the first format one or more keys of the virtual keyboard which match a set of predicted input characters having a highest predictive rank; and
highlighting in the second format one or more keys of the virtual keyboard which do not match the set of predicted input characters having the highest predictive rank.

11. An electronic device, comprising: a processor;
a touchscreen display coupled to the processor, the touchscreen having a virtual keyboard displayed thereon;
wherein the processor is configured to:
receive an input of a character from the virtual keyboard,
highlight a key in the virtual keyboard which displays the input character when the input character belongs to a current set of characters which is incomplete, wherein the highlighted key is in a plurality of highlighted keys,
receive a subsequent user input from the virtual keyboard,
upon a determination of an erroneous character in the current set of characters, adjust the highlighting of one or more of the highlighted keys in the virtual keyboard which display the determined erroneous character,
upon a determination that the subsequent user input completes the current set of characters based on determination that the subsequent user input is a delimiter input, unhighlight all highlighted keys in the virtual keyboard, and
upon a determination that the subsequent user input does not complete the current set of characters, adjust the highlighting of one or more of the highlighted keys in the virtual keyboard based on one or more predetermined criteria.

12. The electronic device of claim 11, wherein the processor is configured to generate one or more sets of predicted input characters based on the input character, wherein the highlighting comprises:
highlighting in a first format one or more keys of the virtual keyboard which match the one or more sets of predicted input characters; and
highlighting in a second format one or more keys of the virtual keyboard which do not match the one or more sets of predicted input characters.

13. The electronic device of claim 12, wherein the highlighting comprises:
highlighting in the first format one or more keys of the virtual keyboard which match a set of predicted input characters having a highest predictive rank; and
highlighting in the second format one or more keys of the virtual keyboard which do not match the set of predicted input characters having the highest predictive rank.

14. A keyboard rendered on a display of an electronic device, the keyboard comprising:
a plurality of keys, each key corresponding to one or more different characters of a plurality of characters;
wherein in response to receiving an input of a character, the keyboard is configured to highlight a key in the virtual keyboard which displays the input character when the input character belongs to a current set of characters which is incomplete, wherein the highlighted key is in a plurality of highlighted keys, and
wherein in response to receiving a subsequent user input from the virtual keyboard, the keyboard is configured to adjust, upon a determination of an erroneous character in the current set of characters, the highlighting of one or more of the highlighted keys in the virtual keyboard which display the determined erroneous character, to unhighlight all highlighted keys in the virtual keyboard upon a determination that the subsequent user input completes the current set of characters based on the subsequent user input being a delimiter input, and to adjust the highlighting of one or more of the highlighted keys in the virtual keyboard based on one or more predetermined criteria upon a determination that the subsequent user input does not complete the current set of characters.

15. A non-transitory computer-readable medium storing a set of instructions that are executable by at least one electronic device having at least one processor, to cause the electronic device to perform a method, the method comprising
receiving an input of a character from a virtual keyboard displayed on a display;
highlighting a key in the virtual keyboard which displays the input character when the input character belongs to a current set of characters which is incomplete, wherein the highlighted key is in a plurality of highlighted keys;
receiving a subsequent user input from the virtual keyboard;
upon a determination of an erroneous character in the current set of characters, adjusting the highlighting of one or more of the highlighted keys in the virtual keyboard which display the determined erroneous character;
upon a determination that the subsequent user input completes the current set of characters based on the subsequent user input being a delimiter input, unhighlighting all highlighted keys in the virtual keyboard; and
upon a determination that the subsequent user input does not complete the current set of characters, adjusting the highlighting of one or more of the highlighted keys in the virtual keyboard based on one or more predetermined criteria.

16. The non-transitory computer-readable medium of claim 15, wherein the one or more predetermined criteria comprises a duration of time since a last input was received from the virtual keyboard.

17. The non-transitory computer-readable medium of claim 15, wherein the one or more predetermined criteria comprises occurrence of a predetermined number of subsequent character inputs since a last input was received from the virtual keyboard.

18. The non-transitory computer-readable medium of claim 15, wherein the one or more predetermined criteria may comprise a duration of time since a last interaction with the particular keys in the virtual keyboard which correspond to the input characters in the current set of characters.

19. The non-transitory computer-readable medium of claim 15, wherein the method further comprises:
generating one or more sets of predicted input characters based on the input character; and
wherein the highlighting comprises:
highlighting in a first format one or more keys of the virtual keyboard which match the one or more sets of predicted input characters; and
highlighting in a second format one or more keys of the virtual keyboard which do not match the one or more sets of predicted input characters.

20. The non-transitory computer-readable medium of claim 19, wherein the highlighting comprises:
highlighting in the first format one or more keys of the virtual keyboard which match a set of predicted input characters having a highest predictive rank; and
highlighting in the second format one or more keys of the virtual keyboard which do not match the set of predicted input characters having the highest predictive rank.

* * * * *